Oct. 29, 1957  O. RIETMANN  2,811,158
GRAIN SEPARATING STRUCTURE FOR COMBINE
Filed Sept. 16, 1955  5 Sheets-Sheet 1

Omar Rietmann
INVENTOR.

Oct. 29, 1957     O. RIETMANN     2,811,158
GRAIN SEPARATING STRUCTURE FOR COMBINE
Filed Sept. 16, 1955     5 Sheets-Sheet 3

Omar Rietmann
INVENTOR.

BY *Clarence A. O'Brien*
*and Harvey B. Jacobson*
Attorneys

Oct. 29, 1957     O. RIETMANN     2,811,158
GRAIN SEPARATING STRUCTURE FOR COMBINE
Filed Sept. 16, 1955     5 Sheets-Sheet 5

Omar Rietmann
INVENTOR.

United States Patent Office 2,811,158
Patented Oct. 29, 1957

2,811,158

GRAIN SEPARATING STRUCTURE FOR COMBINE

Omar Rietmann, Ione, Oreg.

Application September 16, 1955, Serial No. 534,658

1 Claim. (Cl. 130—27)

This invention relates generally to vehicular combines and is more particularly concerned with an improved thresher apparatus for use under varying conditions of inclination of the thresher for readily and expeditiously separating the grain from the straw and chaff.

A primary object of the invention is to provide an open-ended housing including a lower trough for receiving and conveying grain, a longitudinally disposed, peripherally driven, open-ended grain separating drum mounted in said housing for rotation about its longitudinal axis, transverse beater and thresher cylinder structure associated with the open front end of said drum and supported in said housing, a reciprocating straw walking assembly disposed longitudinally within the drum, said drum including an inner peripheral helical track for advancing grain longitudinally within the drum, said drum having a uniformly apertured surface permitting a predetermined size of grain to pass through into the trough of the housing, and longitudinally disposed forced draft means directed upwardly toward the longitudinal axis of rotation of the separating drum and rearwardly toward the open end of the separating drum and housing.

A further object of the invention, in conformance with that set forth above, is to provide means for adjusting the apertures in the separating drum for varying sizes of grain being separated, and including adjusting means incorporated with the forced draft means for determining the velocity of draft utilized in the threshing apparatus for separating chaff from the grain.

Another object of the invention is to provide a thresher apparatus of the character set forth which is highly efficient and readily usable for the purpose intended.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 7 is an enlarged fragmentary perspective view illustrating a double walled grain separating drum whereby the size of the apertures through which the grain is separated may be adjusted; and Figure 8 is an enlarged sectional view taken substantially on line 8—8 of Figure 7.

Figure 1:
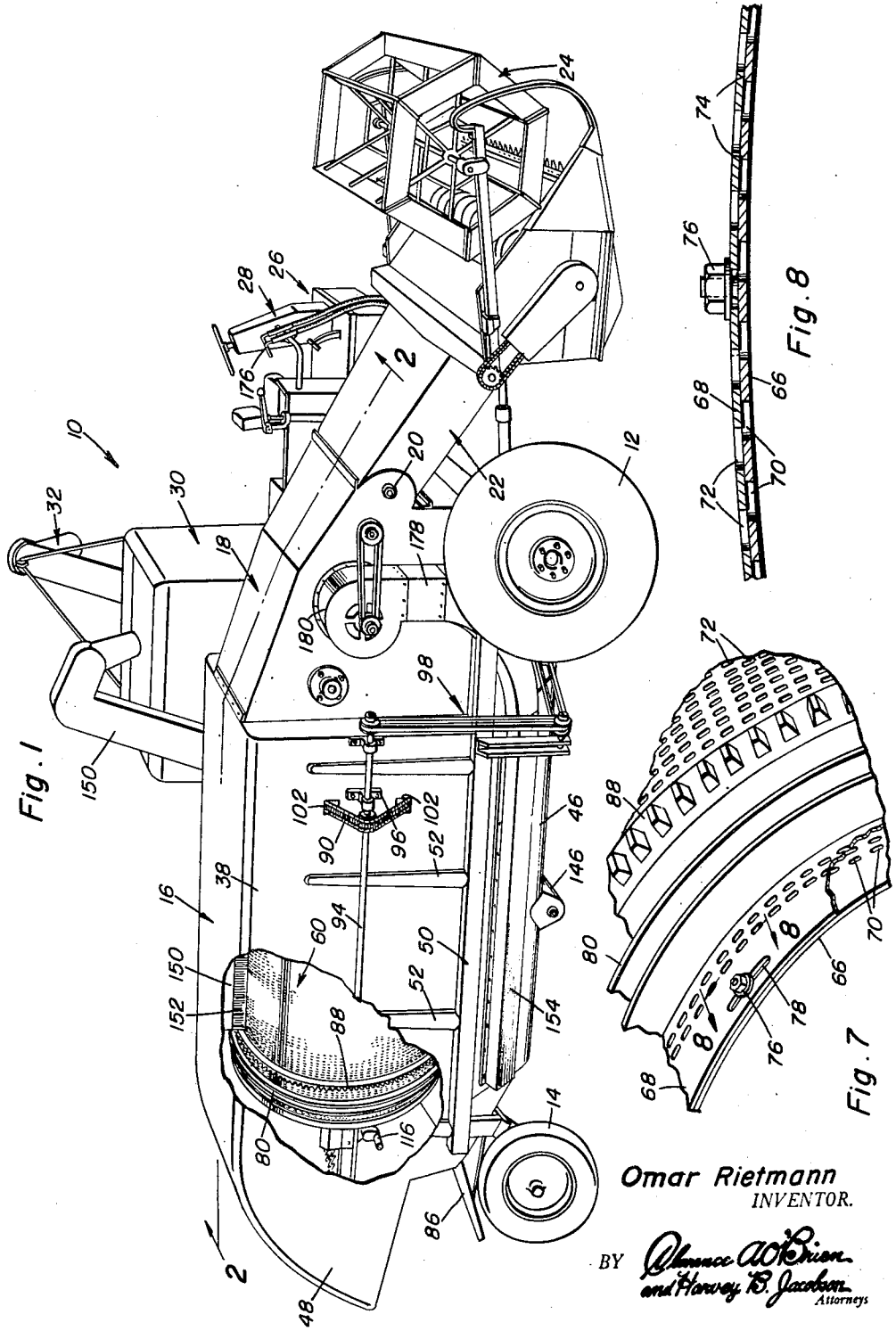
Figure 1 is a perspective view of a combine incorporating the novel thresher structure, with portions broken away for clarity.

Indicated generally at 10 is a vehicular combine which includes a suitable chassis supporting front driven wheels 12 and rear steerable wheels 14, the chassis supporting, in any suitable manner, a housing member indicated generally at 16 suitably secured and in communication with a forwardly converging tapered housing portion 18 which supports on a conventional transverse pivot shaft 20 a forward endless conveyor assembly 22 of any conventional character which has suitably mounted thereon a conventional cutter and crop-engaging reel assembly 24. The combine also incorporates thereon the usual operator's platform 26 including a steering column assembly 28, operator's seat and controls, and a suitable bulk storage bin for separated grain is provided at 30, said bin being in communication with a suitable dispensing nozzle 32.

The heretofore described structure from all outward appearances would appear to be that of a conventional combine. However, the thresher or separating structure to be subsequently described within the housing members 16 and 18 defines the invention involved herein.

Figure 4:
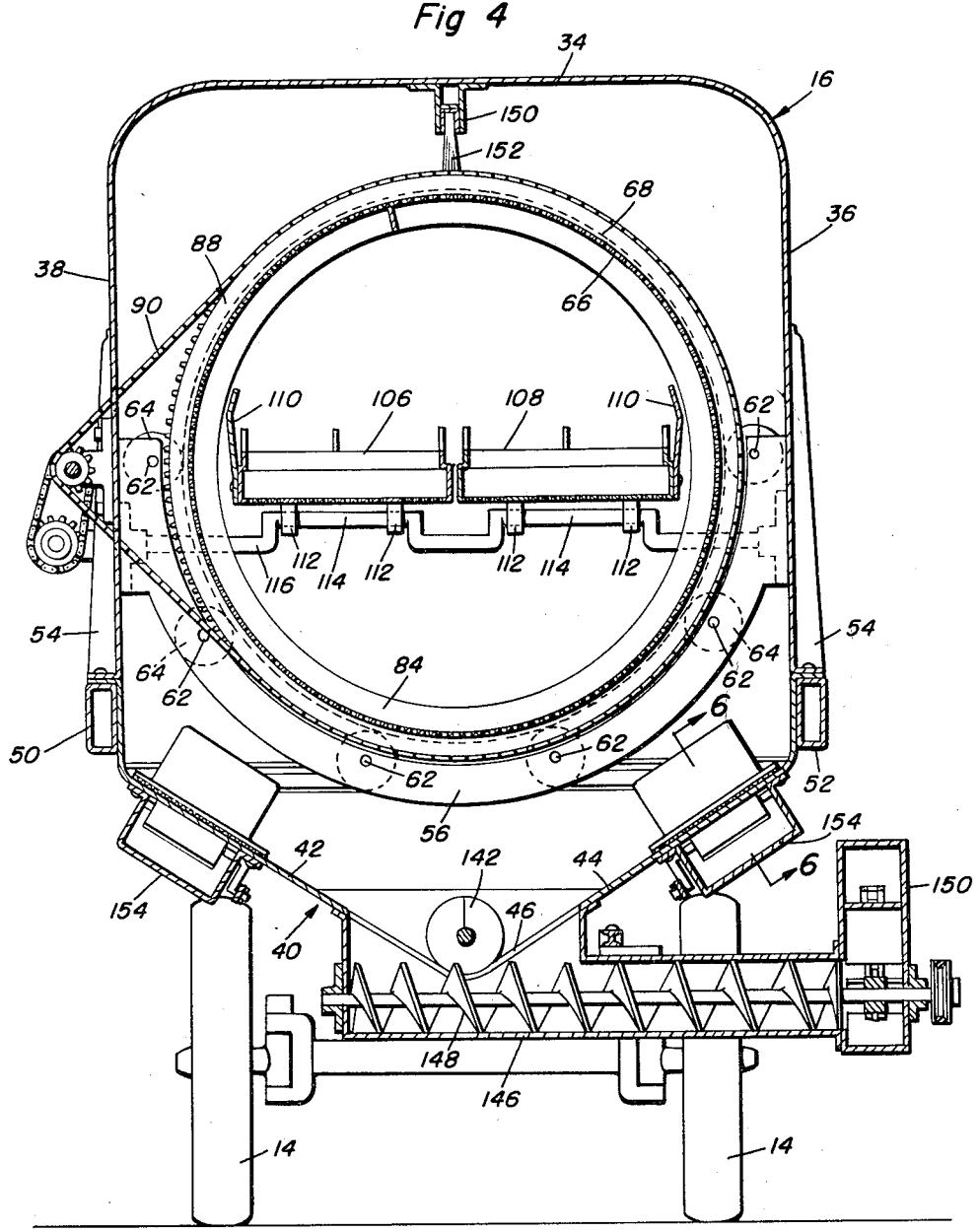
Figure 4 is a sectional view taken substantially on line 4—4 of Figure 2.
Figure 5:
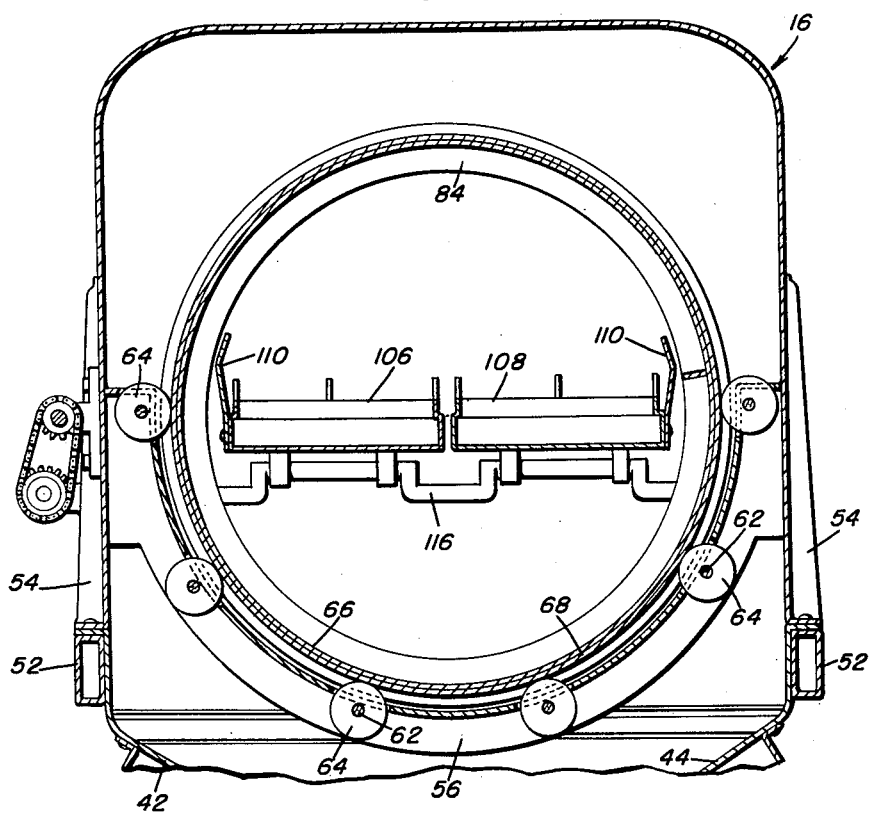
Figure 5 is a sectional view taken substantially on line 5—5 of Figure 2.

The housing 16, as shown in Figures 4 and 5, has a substantially rectangular cross-sectional configuration. However, the housing member 16 may also be of a circular cross-sectional configuration. As disclosed, the housing member 16 includes a top portion 34, vertical sides 36 and 38, and a bottom 40 including the converging sides 42 and 44 which define a longitudinally disposed lower trough portion 46. The top 34 and sides 36 and 38 terminate at the rear of the thresher housing in a downwardly opening hood 48 for disposing straw and chaff separated from the grain onto the ground. As seen in Figures 4 and 5, the housing member 16 may be supported on longitudinally disposed side frame members 50 and 52 by means of suitably connected, horizontally extending, integral brace elements 54. Suitably secured in longitudinally spaced relation to the inner side walls of the housing member 16 are a pair of support cradles 56 and 58, which are arcuate and conform generally to the outer circumference of a rotatable grain separating drum assembly, indicated generally at 60, to be subsequently described, said cradles 56 including transverse shaft portions 62 rotatably supporting freely journaled roller elements 64 which are rotatable on an axis substantially parallel to the axis of rotation of the grain separating drum assembly 60, as most clearly seen in Figures 4 and 5.

The grain separating drum assembly 60 includes mutually telescoped inner and outer open-ended cylinders 66 and 68, respectively, each of which includes a plurality of uniformly and circumferentially disposed, elongated aperture portions 70 and 72, respectively, which are alignable, see Figure 8, portions of the drums indicated at 74 overlapping and serving to decrease the size of the aperture portions, thus limiting the size of the grain which will pass therethrough. The inner drum 66 may include a plurality of laterally extending stud and nut assemblies 76 which pass through suitable elongated circumferentially disposed slot portions 78 in the outer drum, see Figure 7, which permit the aforementioned adjustment, whereafter the drums are secured in a relatively fixed position.

The outer drum portion 68 includes in longitudinally spaced relation thereon in alignment with the previously mentioned cradles 56 and 58 an annular track element 80 and 82 which receives therein the previously mentioned rollers 64, the grain separating drum being freely rotatable on said rollers.

The inner drum 66 includes on the inner peripheral circumference thereof and secured in any suitable manner a helical feed rib 84 which is suitably disposed therein for feeding grain received on the inner periphery in a longitudinal movement across the previously mentioned apertures of said drum, whereby the grain passes therethrough. Material being screened out, such as heavier foreign matter and seed which is larger than the previously mentioned apertures, will be moved out of the open end of said drum upon the proper rotation thereof, being passed upon a suitably disposed and secured rear chute element 86. The chute element 86 extends transversely of the housing 16, see Figure 3.

The outer grain separating drum portion 68 includes a pair of spaced, annularly disposed peripheral gear teeth portions 88 around which a suitable drive chain 90 is journaled, said drive chain being journaled over a drive gear 92 secured on a longitudinally disposed drive shaft 94 carried in suitable aligned journal blocks 96 suitably secured on the side 38 of the housing member 16. The drive shaft 94 is driven by means of a suitable drive belt and pulley assembly indicated generally at 98 which is operatively connected to the engine 100, see Figure 3, of the combine, such connections being of any suitable character. It will be noted in Figure 1 that suitable aperture portions 102 are provided in the side 38 of the housing member to accommodate the drive chain 90 therethrough.

A longitudinally disposed straw walking assembly is indicated generally at 104 and extends through the grain separating drum assembly 60 and is comprised of a pair of adjacent reciprocating elongated trough members 106 and 108, see Figures 4 and 5, which are disposed substantially on the lateral axis of the grain separating drum, including upwardly disposed rail portions 110 for preventing straw from falling down into the grain separating drum, said rails being secured thereon in any suitable manner, the members 106 and 108 having their opposite ends extending out of the grain separating drum assembly 60 and including depending bracket portions 112, see Figures 4 and 5, which are journaled on a lateral crank portion 114 of transversely disposed reciprocating shaft members 116 which are rotatably supported in opposite side portions of the housing member 16, in any suitable manner, and which may be driven in any suitable manner by means of the beveled drive gear assembly 118 which may be operatively connected in any suitable manner to the previously mentioned engine 100. The straw walker troughs 106 and 108 are conventional and will include a suitable apertured bottom portion for permitting grain to be sifted therethrough by reciprocating movement of the straw walker, the straw being disposed and deposited by said straw walker out of the open rear end of the housing member.

Figure 3:
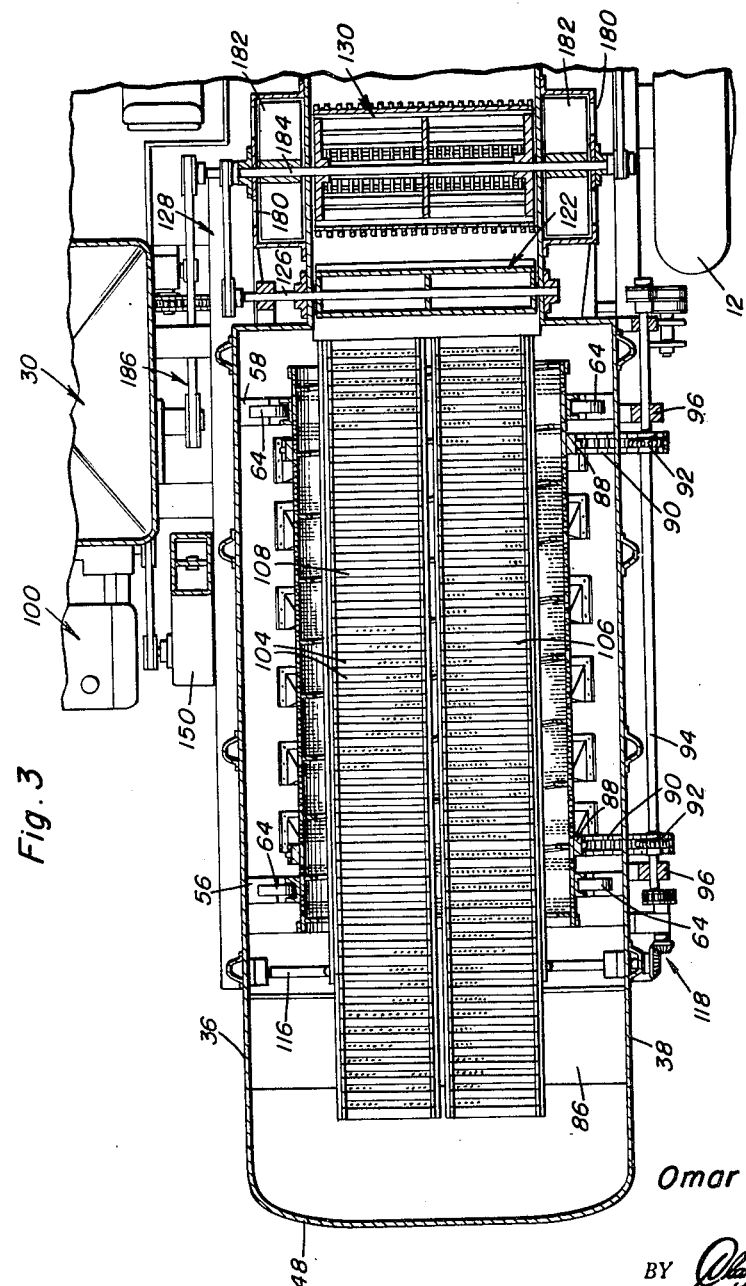
Figure 3 is a sectional view taken substantially on line 3—3 of Figure 2.

Disposed in housing portion 18 are a pair of longitudinally spaced beater assemblies 120 and 122 which are suitably mounted on transversely disposed shafts 124 and 126, respectively, in any suitable manner by means of the drive belt assemblies indicated generally at 128 in Figure 3, and disposed between the aforementioned beater assemblies is a thresher cylinder assembly 130, of any suitable character, which has disposed therebeneath an arcuate separation plate 132 which extends transversely of the housing member 18 and which is connected at opposite ends to suitable plate portions 134 and 136 which guide the material being threshed from the conveyor assembly 22 past the beaters and thresher cylinder assembly, whereupon the initial separation of the grain from the chaff and straw is made, after which the material is moved upon the straw walker assembly 104 in the usual manner.

Underlying the portion 132 of the thresher cylinder is a transversely disposed, downwardly directed conveyor trough 138 which conveys the grain into the interior of the grain separator drum.

A longitudinally disposed trough 46 of the housing member 16 includes a longitudinally suitably journaled drive shaft 140 therein which carries at opposite ends oppositely pitched screw conveyor assemblies 142 and 144 which urge grain falling through the separating drum assembly 60 toward a lower transverse center trough portion 146 which includes a suitably journaled transverse screw conveyor 148 therein for conveying grain to a conventional grain elevating assembly 150 which communicates with the bulk bin 30 in a conventional manner.

It will be noted that in spite of the fact that the rear wheels 14 might be of a higher elevation than the forward wheels the helical feed ribs 84 in the grain separating drum continue to urge the grain longitudinally through the drum out of the rear open end of the drum and housing member, and it will also be noted that the screw feeders 142 and 144 will continue to feed the separated grain toward the center of the transverse trough 146 regardless of the angular disposition of the housing member 16.

Figure 2:
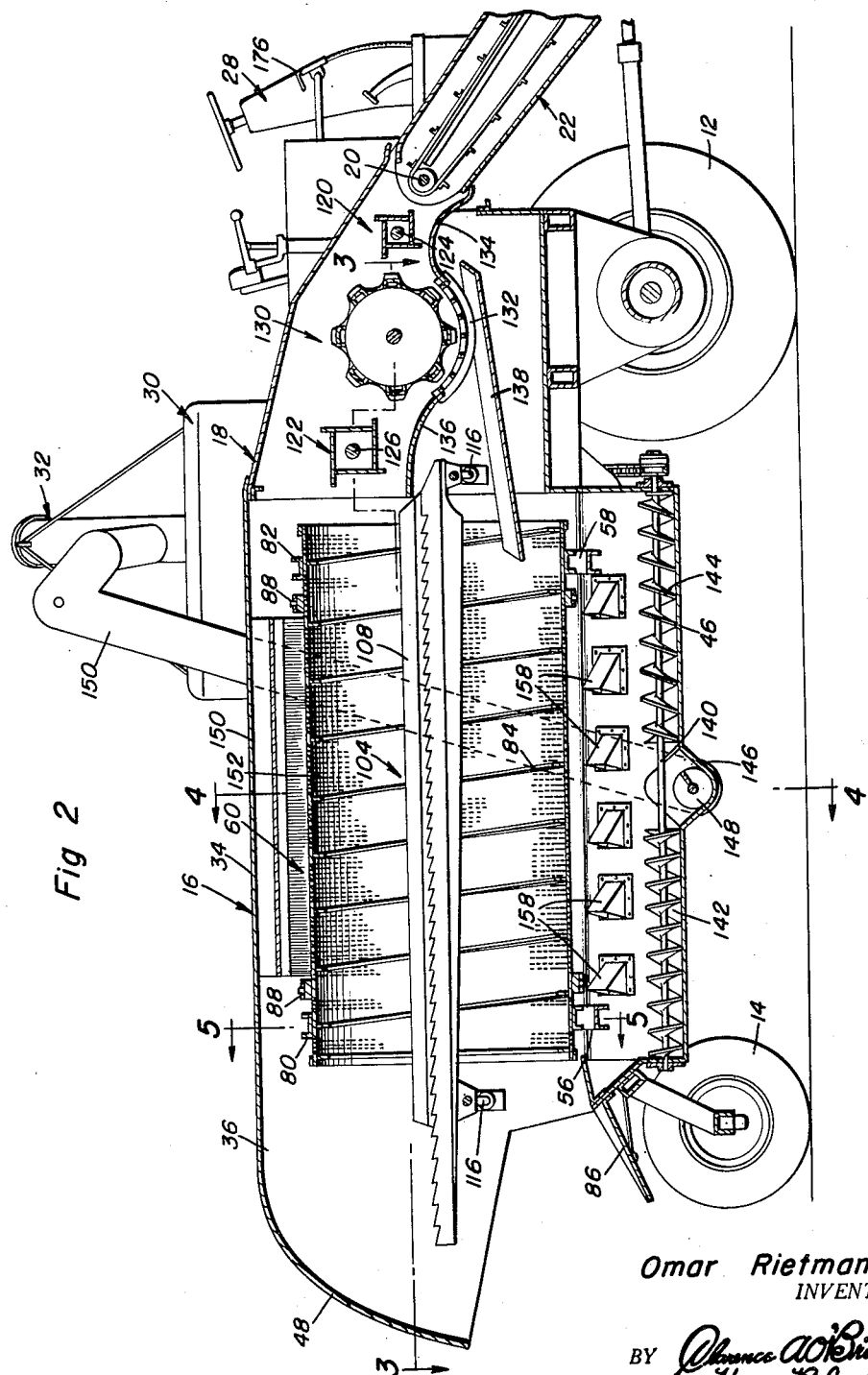
Figure 2 is a sectional view taken substantially on line 2—2 of Figure 1.

As seen in Figures 2 and 4, for example, a longitudinally brushing member 150 is suitably secured in depending relationship on the top 34 of the housing member 16, and includes a bristle portion 152 in peripheral engagement with the outer periphery of said drum, which accordingly prevents the contaminating or closing up of the grain apertures 70 and 72 in the drum assembly 60.

Figure 6:
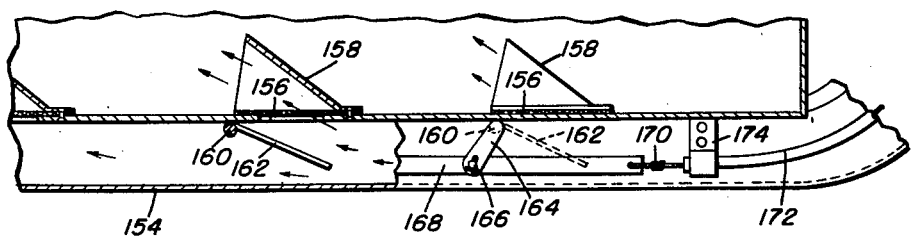
Figure 6 is a sectional view taken substantially on line 6—6 of Figure 4.

The bottom converging portions 42 and 44 of the housing member 16 each includes a longitudinally disposed forced air draft conduit 154, being secured thereon in any suitable manner, said conduits 154 each including a plurality of longitudinally spaced aperture portions 156, see Figure 6, having extending thereover a suitably secured hood element 158 which directs a blast of forced air upwardly toward the longitudinal axis of rotation of the grain separating drum as well as rearwardly toward the open end of said drum and toward the hood portion 48 of the housing member 16. The aforementioned forced draft will pass through the apertures of the drum assembly 60, thus urging the relatively light chaff out of the rear of the housing member. Each of the conduits 154 includes a plurality of transversely disposed pivot shaft elements 160 suitably journaled in opposite side portions thereof and which have integrally secured thereon a control flap element 162 which may be moved toward and away from the aperture portion 156 for controlling the volume of air passing therethrough. The shafts 160 have secured on an end portion thereof, in any suitable manner, externally of the conduit 154, an actuating lever 164 pivotally secured at 166 to an actuating rod 168, said rod being secured at an end portion, in any suitable manner, to a flexible Bowden wire element 170, the housing 172 of which is carried on a suitable support bracket 174, see Figure 6, suitably secured to the housing member 16, said Bowden wire extending to a control portion 176 adjacent the steering column 128, see Figure 1.

The conduits 154 are formed integral with the sides 36 and 38 of the housing member 16 and are in communication with a connecting conduit portion 178 which terminates in a substantially circular portion 180 which houses therein a suitable fan member 182 journaled on a transverse shaft 184 which may also carry the thresher cylinder assembly 130, see Figure 3. The shaft 184 may be driven by a suitable drive belt and pulley assembly, indicated generally at 186.

Although portions of the various drives for the movable parts of the thresher apparatus have been shown and described, it is to be understood that suitable equivalents thereof may be utilized herein without departing from the concept of invention.

Operation of the thresher apparatus is apparent from the heretofore provided description and, accordingly, further description is believed to be unnecessary.

Various positional directional terms, such as "front," "rear," "top," etc. are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention

What is claimed as new is as follows:

In a grain thresher, an elongated horizontal casing having a bottom provided with downwardly converging sides, a transverse rotary threshing cylinder in the casing, a longitudinal perforated separator drum rotatably mounted in said casing at one side of the cylinder for receiving grain threshed by said cylinder and sifting grain therethrough to separate grain from chaff, said drum having an open rear end and having perforations, means forming a part of said drum for adjusting the size of the perforations, and air blast means for directing air under pressure upwardly through said drum on opposite sides thereof and toward the rear end of the drum to blow light chaff out of said rear end of the drum, said air blast means comprising a pair of longitudinal air blast conduits on said sides of said bottom externally thereof, said sides having longitudinally spaced air blast discharge openings therein communicating with said conduits, hoods on the inner surfaces of said sides overlying said openings and spaced from said drum for discharging air from said openings upwardly and rearwardly of and into said drum, fans on said casing for forcing air pressure through said conduits and said openings, air blast control flaps pivoted to said casing and located within said longitudinal conduits, said flaps being movable to a position flush against said casing to completely close the openings, and mechanical means secured to each flap for moving all of said flaps in unison from between the fully open and fully closed positions.

References Cited in the file of this patent

UNITED STATES PATENTS

| | | |
|---|---|---|
| 801,141 | Erickson | Oct. 3, 1905 |
| 916,216 | Sullivan | Mar. 23, 1909 |
| 2,129,452 | Van Sickle | Sept. 6, 1938 |
| 2,577,488 | Stephenson | Dec. 4, 1951 |